Aug. 9, 1932.    R. P. JACKSON    1,871,371
SOLDER JOINT STRUCTURE
Filed July 16, 1929
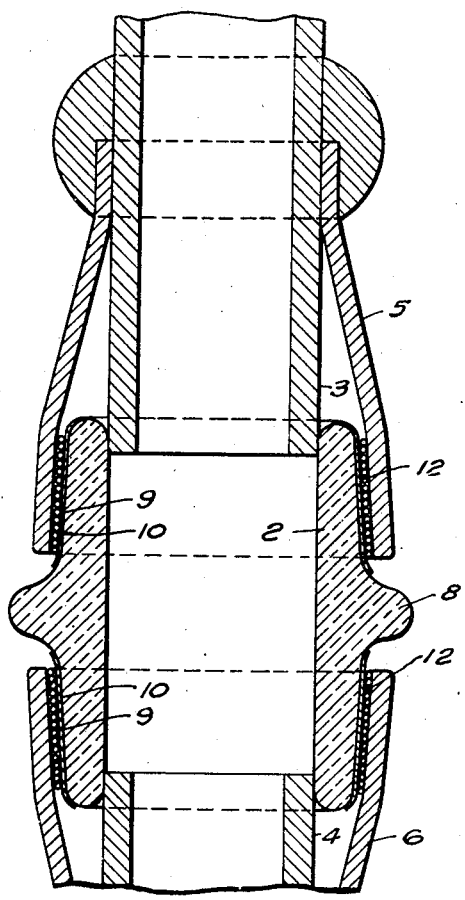
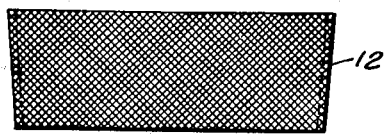
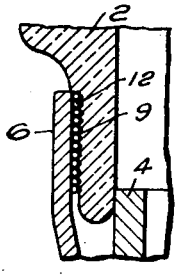 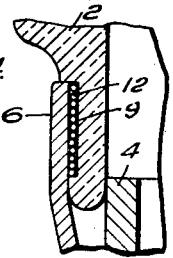
INVENTOR
Ray P. Jackson.
BY
ATTORNEY Patented Aug. 9, 1932

1,871,371

UNITED STATES PATENT OFFICE

RAY P. JACKSON, OF BERKELEY, CALIFORNIA, ASSIGNOR TO WESTINGHOUSE ELECTRIC & MANUFACTURING COMPANY, A CORPORATION OF PENNSYLVANIA

SOLDER JOINT STRUCTURE

Application filed July 16, 1929. Serial No. 878,682.

My invention relates to solder-joint structures and particularly to means for soldering inorganic dielectric bodies, such as porcelain members, to metal bodies or to other similarly prepared dielectric bodies.

One object of my invention is to provide a device of the above-indicated character that shall facilitate the soldering of the insulating member to a metal member by a usual soldering operation.

Another object of my invention is to provide a method of preparing an inorganic dielectric body having a superficial film of metal joined integrally thereto, for soldering to another article by a relatively unskilled operator.

A further object of my invention is to provide a device of the above-indicated character that shall be simple and durable in construction, economical to manufacture and effective in its operation.

It has heretofore been suggested, in connection with members of inorganic dielectric materials, such as glass and porcelain, to provide metallic-glaze surface films thereon to permit the soldering of metallic members thereto. By reason of the properties of the film of metal on the dielectric member, however, special skill is usually required to effect adequate joinder of a metal body thereto.

Operators, skilled in soldering metal-to-metal, have difficulty in effecting permanent fluid-tight and mechanically strong soldered joints between the superficial metal film and the body to which it is to be soldered, and it is necessary, in order to construct an effective joint in this field of use, for such operators to become specially skilled or to attain special knowledge of the characteristics of both the dielectric material and the film.

It is my aim to overcome the above objection so that an operator merely skilled in the art of making good metal-to-metal soldered joints may readily solder metal to porcelain, and thereby promote the further use and effective operation of such joints.

Accordingly, in practicing my invention, I provide an inorganic dielectric body having a superficial metal-glaze film thereon and a method of so preparing the film as to render the soldering of another body thereto a relatively simple operation, and well within the skill of an ordinary solder worker.

Figure 1 of the accompanying drawing is a view in longitudinal section of a cable joint or conduit structure embodying my invention, and Figs. 2, 3 and 4 are detail views of modifications of portions of the device shown in Fig. 1.

The device comprises in general a dielectric body 2, members 3 and 4 to be connected thereby, and members 5 and 6 for effecting a fluid-tight connection between the several members 3 and 2, and 4 and 2, respectively.

The member 2 is preferably constructed of inorganic dielectric material, such as porcelain, and, in this instance, is in the form of a tube having an annular intermediate outer ridge 8 and slightly tapered or frusto-conical outer surfaces 9 converging away from the ridge 8.

The porcelain member 2 is initially constructed in a usual manner by coating with a silicate glaze and firing in a kiln. After it has been removed from the kiln and cooled, metallic bands or films 10, in the form of a liquid solution, are placed on the surfaces 9, while in a wet state, and returned to the kiln for further firing operation, during which the bands 10 become metallized in integral joinder to the body 2 and of lustrous metallic character. A preferred material or glaze for the bands 10, as heretofore employed, comprises, in addition to the essential oils of lavender and spike, about 7.85% metallic residue containing approximately 4.3% platinum, in the form of platinic chloride or metal, 3.1% gold, in the form of gold chloride or metal. 0.3% bismuth in the form of chloride or metal, and about 0.1% insoluble residue.

Although members similar to the members 5 and 6 may be soldered directly to the metallic bands or films 10, special skill is required to effect a good fluid-tight permanent joint. Difficulty in soldering to the bands or films is caused by the brittle nature of the member 2 and by the extreme thinness and other characteristics of the films or bands 10, whereby local application of the relatively high soldering temperatures causes damage to the films and to the member 2, and insufficient temperatures fail to effect a good joint.

To overcome the above-mentioned features, and to enable an ordinary solder worker to effect a good joint, sleeves 12 are provided on the films 10 to give more body or thickness to the bands, and to conduct heat away from spots or local application to prevent damage to the device and to render the making of the joints simple and effective.

The sleeves 12 preferably comprise layers of wire wound tightly about the body 2 and secured thereto.

It is preferable also that the sleeves 12 consist of tinned wire so that when subjected to heat, the soldering agent is present, although further solder may be applied during the heating operation.

The sleeves 12, in the form shown, irrespective of how tightly and closely they are wound, provide spaces between the turns, so that the solder or tinned coatings thereon, and further solder which may be supplied, flows freely around and about the turns to cohere to the bands 10 and to provide an outer base or film to which the members 5 and 6 may be readily soldered by an ordinary soldering operation. The sleeves 12 being of copper, or similar good heat-conducting metal not fusible at the soldering temperatures, readily conduct heat from any point of local application, so that such local application may be maintained long enough to effect a good solder joint without damage to the refractory insulating material.

It is also contemplated in my invention that the bands or films 10 of metallic glaze may, in certain instances, be omitted and the sleeves 12 wound on the body 2 so tightly as to effect a good joint for certain purposes. In the latter construction, the relatively soft tinned coating on the wire of the sleeves 12 flattens against the body 2, or yields with the tension under which the wire is applied, to form a relatively fluid-tight seal with respect to the member 2, especially after the application of heat.

Also, the surfaces 9 may be roughened, grooved or provided with shoulders to better seat the wire turns and to reinforce the sleeve 12 against longitudinal forces between the member 2 and the members 5 and 6, as shown in Figs. 3 and 4.

As shown in Fig. 2, the sleeve 12, instead of being wound, as in the above-described structure, is of perforate-sheet or screen form which, if of complete ring or band shape, may be placed over the ends of the body 2 with considerable longitudinal force or, if split, may be clamped under perimetral tension about the body 2 while the soldering heat is applied.

While I have shown and described particular forms of my invention, changes may be effected therein without departing from the spirit and scope thereof, as set forth in the appended claims.

I claim as my invention:

1. In combination, a body of inorganic dielectric material, a fired superficial film of metal joined integrally thereto, and a metal-coated metal element on said film, an inner portion of the metal coating of said element being joined integrally to the film and an outer portion of said coating constituting means for joining another element thereto.

2. In combination, a body of inorganic dielectric material, a fired superficial film of metal joined integrally thereto, and a perforate sheet-like metal element on the film, said element being metal coated on both sides with the inner and outer coating portions joined integrally through a perforate portion thereof and the inner portion joined integrally to the film.

3. In combination, a body of inorganic dielectric material, a fired superficial film of metal joined integrally thereto, a metal element on said film, a metal bonding medium between, and joined integrally to, the film and the element, and a metal bonding medium of the same material as said first medium on the outer surface of the element.

4. In combination, a tubular body of inorganic dielectric material, tubular fired superficial films of metal longitudinally spaced thereon in integral joinder thereto, metal sleeves on said films, and a metal bonding medium on both sides of the sleeves connected through perforations in the sleeve side walls joined integrally to the films.

5. In combination, a tubular body of inorganic dielectric material, tubular fired superficial films of metal longitudinally spaced thereon in integral joinder thereto, and metal sleeves each having a single coating of one material extending to both sides thereof and disposed on one of said films, portions of said coating at one side of the sleeve being joined integrally to one of the films and a portion of the coating at the other side of the sleeve constituting a base for joining an element integrally thereto.

6. In combination, a tubular silicate-glazed porcelain body including an intermediate annular outer ridge and outer substantially frusto-conical surfaces convergingly sloped from positions adjacent to said ridge to positions adjacent to the ends of the body, fired superficial films of metal substantially entirely covering said surfaces in integral joinder to the body, copper sleeves conforming to, and substantially entirely covering, said films in relatively close relation thereto, said sleeves having lateral apertures therethrough distributed substantially uniformly throughout the area thereof, and solder on both sides of the sleeves connected through the perforations of the sleeves, the inner solder being joined integrally to the films and the outer solder constituting a base for soldering a metal element thereto.

7. In combination, a body of inorganic dielectric material, a film of metal thereon, a sleeve-like band of tightly wound metal wire over said film, and a metal bonding medium holding the wire convolutions in tightly-wound relation to each other and to said film.

8. In combination, a body of inorganic dielectric material having a metal coating thereon, and a tightly-wound metal-coated metal wire soldered in position to said coating.

9. The method of preparing an inorganic dielectric main body having a fired superficial film of metal thereon for solder attachment to another main body which includes placing a metal element having a fusible metal coating thereon against said film and subjecting the parts to heat to join said element and its coating integrally to the film.

10. The method of preparing an inorganic dielectric main body having a fired superficial film of metal thereon for solder attachment to another main body which includes placing a metal element having a fusible metal coating thereon against said film and subjecting the parts to heat while applying further fusible-metal bonding material to join said element and its coating integrally to the film.

11. The method of preparing an inorganic dielectric body having a metal coating thereon for fluid-sealed solder-attachment to another body which includes soldering a good solder-assuming metal element to said coating in relatively tight binding sealed holding relation to the dielectric body.

12. The method of preparing an inorganic dielectric body having a metal coating thereon for fluid-sealed solder-attachment to another body which includes winding a good solder-assuming flexible metal element in relatively tight binding sealed relation about a portion of the dielectric body over said coating and in fixing the element to said coating.

13. The method of preparing a metal-coated inorganic dielectric body for fluid-sealed solder-attachment to another body which includes winding a flexible metal element having a solder-assuming cover of softer metal in sufficiently tight binding relation about a portion of the dielectric body over said coating to cause the cover to yield against the dielectric body and in fixing the element in position.

14. In combination, a body of inorganic dielectric material, a fired superficial film of metal joined integrally thereto and means for facilitating the soldering of another body to said first body including a preformed metal element infusible at the soldering temperature but having good characteristics for soldering thereto soldered to the film and therewith constituting substantially only a thickened metal coating on, and disposed within the confines of, the dielectric body.

In testimony whereof I have hereunto subscribed my name this 10th day of July, 1929.

RAY P. JACKSON.